United States Patent
Seidel

(10) Patent No.: US 7,505,840 B2
(45) Date of Patent: Mar. 17, 2009

(54) METHOD FOR CONTROLLING AN ELECTRIC PUMP DRIVE MOTOR OF A POWER STEERING DEVICE

(75) Inventor: Mathias Seidel, Neuss (DE)

(73) Assignee: TRW Automotive GmbH (DE)

( * ) Notice: Subject to any disclaimer, the term of this patent is extended or adjusted under 35 U.S.C. 154(b) by 136 days.

(21) Appl. No.: 11/294,328

(22) Filed: Dec. 5, 2005

(65) Prior Publication Data

US 2006/0151234 A1     Jul. 13, 2006

Related U.S. Application Data

(63) Continuation of application No. PCT/EP2004/005579, filed on May 24, 2004.

(30) Foreign Application Priority Data

Jun. 6, 2003   (DE) ................ 103 25 848

(51) Int. Cl.
    *A01B 69/00*   (2006.01)
(52) U.S. Cl. .................. 701/41; 318/268
(58) Field of Classification Search ............ 318/105, 318/268; 701/41
    See application file for complete search history.

(56) References Cited

U.S. PATENT DOCUMENTS

| | | | |
|---|---|---|---|
| 4,392,540 A | | 7/1983 | Michio et al. |
| 4,602,695 A | * | 7/1986 | Takeshima et al. .......... 180/422 |
| 4,702,335 A | * | 10/1987 | Cage et al. .................. 180/423 |
| 4,756,375 A | * | 7/1988 | Ishikura et al. ............. 180/446 |
| 5,040,629 A | * | 8/1991 | Matsuoka et al. ........... 180/446 |
| 5,414,627 A | * | 5/1995 | Wada et al. .................... 701/41 |
| 5,508,919 A | * | 4/1996 | Suzuki et al. .................. 701/41 |
| 5,737,223 A | * | 4/1998 | Matsuoka ..................... 701/41 |
| 5,761,627 A | | 6/1998 | Seidel et al. |
| 5,900,704 A | * | 5/1999 | Henninger et al. .......... 318/268 |
| 6,032,756 A | * | 3/2000 | Nishimura et al. .......... 180/446 |
| 6,064,166 A | * | 5/2000 | Kaji ........................... 318/489 |
| 6,152,255 A | * | 11/2000 | Noro et al. .................. 180/446 |
| 6,216,814 B1 | | 4/2001 | Fujita et al. |
| 6,311,799 B1 | * | 11/2001 | Kaji ........................... 180/422 |
| 6,366,842 B1 | * | 4/2002 | Kaji et al. ..................... 701/41 |
| 6,524,076 B2 | | 2/2003 | Konishi |
| 6,658,335 B2 | * | 12/2003 | Kleinau ........................ 701/41 |
| 7,164,978 B2 | * | 1/2007 | Takaki et al. .................. 701/41 |
| 2001/0036412 A1 | | 11/2001 | Konishi |

FOREIGN PATENT DOCUMENTS

| | | |
|---|---|---|
| DE | 39 20 862 A1 | 1/1991 |
| DE | 101 20 252 A1 | 1/2002 |
| EP | 0 673 328 B1 | 9/1995 |
| JP | 11255134 A | 9/1999 |
| WO | WO 95/11152 | 4/1995 |

\* cited by examiner

*Primary Examiner*—Walter Benson
*Assistant Examiner*—Antony M Paul
(74) *Attorney, Agent, or Firm*—MacMillan, Sobanski & Todd, LLC

(57) ABSTRACT

In a method for controlling an electric pump drive motor of a power steering device, a high output stage and a low output stage are provided, in which the motor can be operated. Between the two output stages at least one further middle output stage in which the motor can be operated is provided. A switchover between the three output stages takes place as a function of the current consumption of the motor.

9 Claims, 3 Drawing Sheets

METHOD FOR CONTROLLING AN ELECTRIC PUMP DRIVE MOTOR OF A POWER STEERING DEVICE

CROSS-REFERENCE TO RELATED APPLICATIONS

This application is a continuation of International Application No. PCT/EP2004/005579 filed May 24, 2004, the disclosures of which are incorporated herein by reference, and which claimed priority to German Patent Application No. 103 25 848.5 filed Jun. 6, 2003, the disclosures of which are incorporated herein by reference.

BACKGROUND OF THE INVENTION

The invention relates to a method for controlling an electric pump drive motor of a power steering device, in which a high output stage and a low output stage are provided, in which the motor can be operated, a switchover between the two output stages taking place as a function of the current consumption of the motor.

From EP 0 673 328 B2, and corresponding U.S. Pat. No. 5,761,627, both of which are incorporated by reference herein, a power-assisted steering system is used in association with a not-shown mechanical steering system in order to reduce the steering torque to be applied via the steering wheel. This is realized by means of a hydraulic cylinder 1, the piston rod 2 of which is connected to a steering tie rod 3 (illustrated in FIG. 3). The chambers 4 and 5 of the hydraulic cylinder 1 are charged with hydraulic fluid in dependence on the steering deflection by means of a pump 7 via a servo-valve 6, through the lines 8 and 9.

The hydraulic diagram in FIG. 1 shows that the hydraulic fluid is pumped from a reservoir 10 to the hydraulic cylinder 1 via the servo-valve 6 by means of the pump 7. If the hydraulic fluid is, for example, pumped into the chamber 4 via the line 8, the piston 11 that is arranged on a piston rod 2 is moved toward the left such that the hydraulic fluid is displaced from the chamber 5 back to the servo-valve 6 via the line 9. This hydraulic fluid then flows back into the reservoir 10. In the neutral position of the hydraulic cylinder 1 and the servo-valve 6 which is illustrated in FIG. 1, no hydraulic fluid reaches the hydraulic cylinder 1. The hydraulic fluid is only pumped from the reservoir 10 back into the reservoir 10 through the servo-valve 6 by means of the pump 7. A pressure control valve 12 that produces a short circuit between the pump 7 and the reservoir 10 for instances in which the hydraulic fluid cannot be discharged via the servo-valve 6 or the servo-valve 6 and the hydraulic cylinder 1 is also arranged in the hydraulic diagram for safety reasons.

The pump 7 that serves for conveying the hydraulic fluid is driven by an electric motor 13 that is supplied with voltage by the battery 14 of the motor vehicle via electronics 21. A detailed illustration of the electronics 21 is shown in FIG. 2. In order to realize a voltage supply of the electric motor 13 that depends on the respective requirements, a current sensor 15 is provided which measures the power requirement of the pump 7 and conveys said power requirement to a switching transistor 16 via an electronic control unit 17.

Instead of the current sensor 15 illustrated in FIG. 2, the power-assisted steering system according to FIG. 3 can also be equipped with a proximity sensor 18 that scans the position of a suitable structural component in the steering gear 19. The information of the proximity sensor 18 is again fed to the electronic control unit 17 which evaluates this signal and determines the supply voltage of the electric motor 18 therefrom.

Also from EP 0 673 328 B2, and corresponding U.S. Pat. No. 5,761,627, a method is known for operating the system shown in FIG. 1 in which the hydraulic pump 7 for the conveying of hydraulic fluid to the servo valve 6 can be driven by the electric motor 13 in two defined output stages, a standby operation and a full-load operation. As illustrated in the diagram of FIG. 4, the motor 13 is operated in the full-load operation A with a high speed n, so that the pump generates a high hydraulic flow $\Phi$. In standby operation B, the motor speed n is reduced to such an extent that only a small hydraulic circulation is maintained. With an increased power requirement of the pump 7, the motor 13 is switched into full-load operation A, or vice versa back into standby operation B again. As a measurement for the output requirement of the hydraulic pump, the current consumption of the motor is detected by means of the current sensor 15. The current sensor is connected with the control unit 17 which evaluates the values of the current sensor and if necessary carries out a switchover from one output stage of the motor into the other.

The two output stages A, B, as can be seen from the diagram of FIG. 4, are independent of the velocity v of the vehicle. An adaptation of the output stages A, B to the vehicle velocity v, i.e. a lowering of the motor speed n and hence of the hydraulic flow $\Phi$ on increasing the vehicle velocity is dispensed with, because with such a lowering in case of need (e.g. in demanding situations with regard to travel dynamics with sudden, rapid steering maneuvers) sufficient volume flow can not be made available in order to provide the necessary steering assistance.

BRIEF SUMMARY OF THE INVENTION

An object of the invention is to provide a method for controlling an electric pump drive motor of a power steering device, which makes possible an improved operating comfort, in particular in changing driving situations and conditions.

In a method of the type initially mentioned, this is achieved according to the invention in that between the high output stage (hereinafter named "full load") and the low output stage (hereinafter named "standby"), at least one further, middle output stage (hereinafter named "load") is provided, which can be switched into as a function of the current consumption of the motor. The load output stage represents an intermediate stage between the two other types of operation of the motor and allows a more flexible adaptation of the pump output to the respectively prevailing requirements. Thus, the motor can be switched over for example from the standby operation, according to requirements, either directly into the full load operation or initially only into the load operation. This applies correspondingly to leaving the full load operation.

Preferably, the switching over of the motor between the individual output stages takes place as a function of at least one further output parameter, in order to further refine the criteria for a switchover of the motor. As further parameters, in particular the absolute current consumption according to the load of the pump driven by the motor and/or the time-dependent change of the current consumption come into consideration, which is representative of the dynamics of the steering-related driving situation and therefore a measurement for the volume flow requirement.

A further development of the invention makes provision that at least one of the output stages is changed as a function of at least one output parameter. This means that during the operation of the motor in one output stage, the motor speed is altered as a function of the output parameter without a switchover taking place into another output stage. Therefore, the operating comfort can be improved within one output stage. Preferably, the vehicle velocity is an output parameter, so that a velocity-dependent adaptation of the output stage can be realized.

In order to avoid irregularities in the steering feel and unnecessary rapid changes between the output stages, the invention proposes that at least one of the following switchovers takes place by a gradual change of the speed of the motor and/or after a delay time:

from the low output stage into the middle output stage;
from the high output stage into the middle output stage;
from the middle output stage into the low output stage.

Other advantages of this invention will become apparent to those skilled in the art from the following detailed description of the preferred embodiments, when read in light of the accompanying drawings.

DETAILED DESCRIPTION OF THE INVENTION

Figure 1:
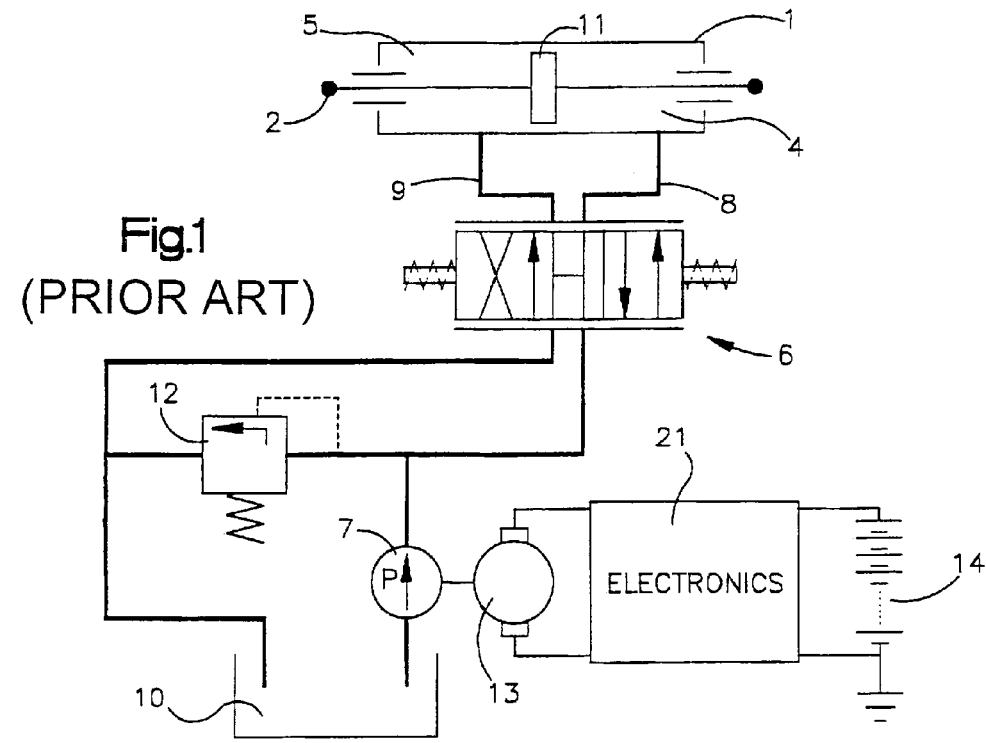
FIG. 1 shows a hydraulic diagram and a circuit diagram of a power-assisted steering system with a current sensor.
Figure 2:
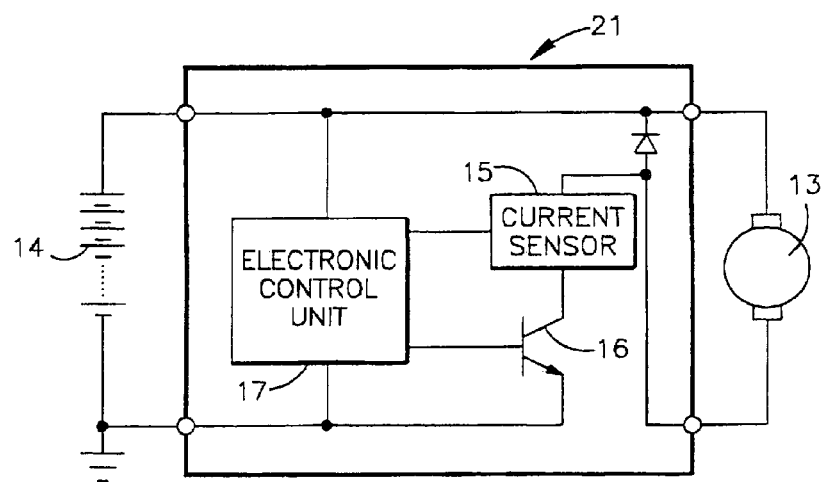
FIG. 2 shows a detailed representation of the electronics with a current sensor which is only illustrated in the form of a block diagram in FIG. 1.
Figure 3:
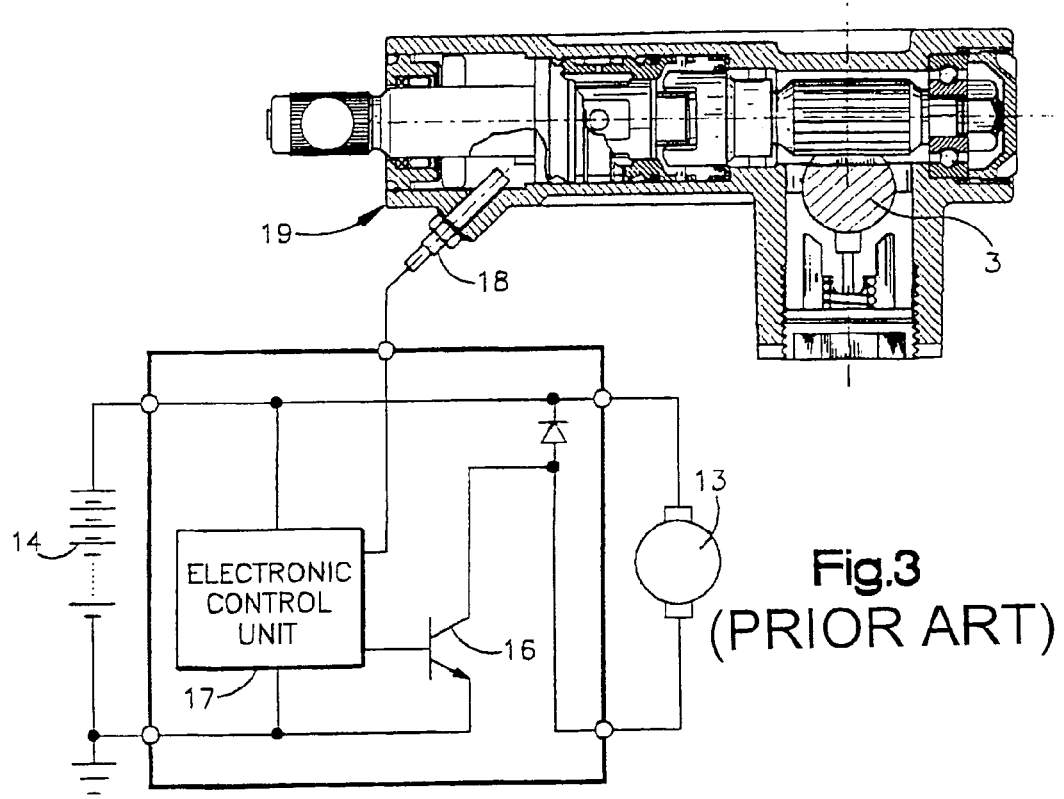
FIG. 3 shows a circuit diagram of a power-assisted steering system as well as the steering gear with a proximity sensor which are illustrated in the form of a longitudinal cross section.
Figure 4:
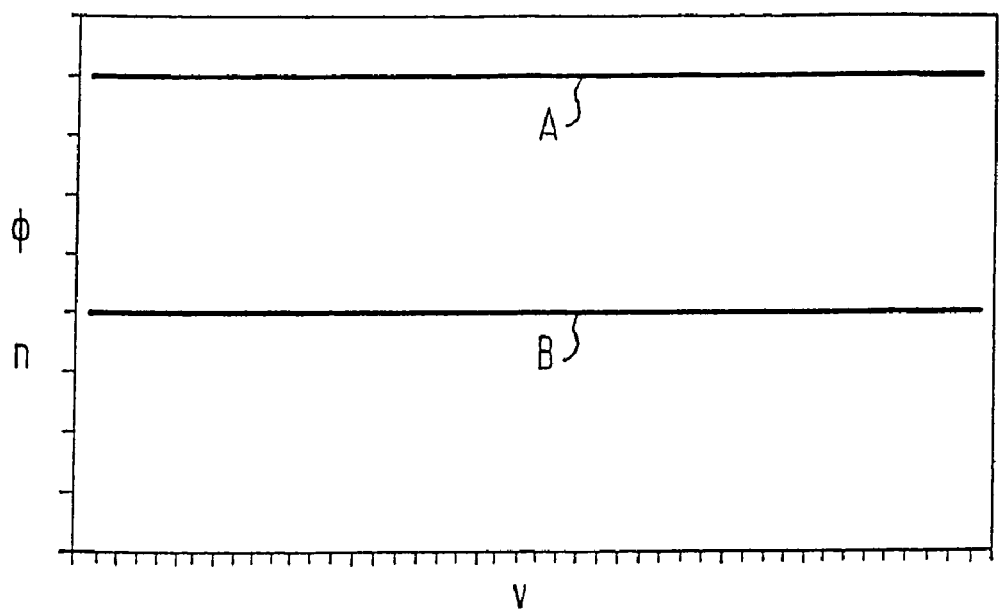
FIG. 4 shows a diagrammatic illustration of the types of operation of a pump drive motor in a method according to the prior art.

In the diagram of FIG. 4 already described, the two output stages standby A and full load B are illustrated as a function of the vehicle velocity v in a method according to the prior art. The speed n of the motor and the hydraulic flow Φ thereby achieved remain constant with an increasing vehicle velocity v.

Figure 5:
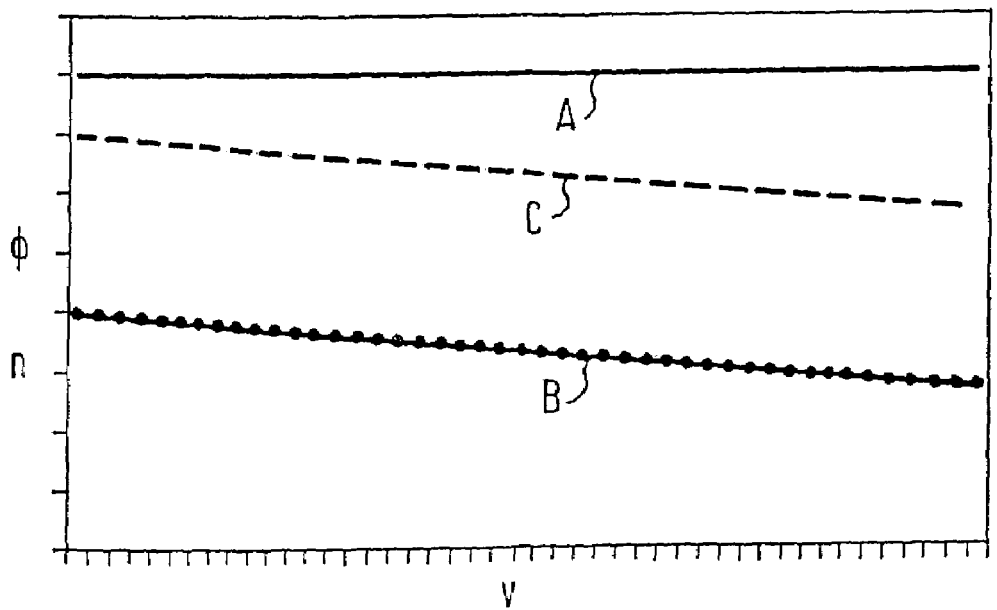
FIG. 5 shows a diagrammatic illustration of the types of operation of a pump drive motor in a method according to the invention.

FIG. 5 shows the output stages as a function of the vehicle velocity v in a method according to the invention. Between the output stages full load A and standby B, a third output stage load C is provided. Whereas the speed n of the pump drive motor remains constant in the output stage full load A, the speed n decreases in the two output stages load C and standby B with the vehicle velocity v. In addition to the linear drop shown by way of example in FIG. 5, other relationships are also possible.

The switchover between the various output stages by a control unit is controlled as a function of the current consumption of the motor and the time-dependent change of the current consumption. The current consumption is passed to the control unit as an input quantity from a current sensor, the time-dependence of the current consumption being determined by the control apparatus.

A possible application of the method according to the invention is described hereinbelow by way of example. With a constant low current consumption of the motor, a switchover is carried out into the standby operation B, unless the motor is already being operated in this output stage. As soon as a given current threshold value is exceeded, an evaluation logic of the control unit decides whether a switchover is carried out into the output stage load C or into the output stage full load A. With a low speed of current rise, corresponding to slow steering movements, the output stage load C is switched into; with a high speed of current rise, corresponding to quick steering movements (e.g. in the case of an evading maneuver) the output stage full load A is switched into. The transition into the output stage load C can be realized such that it does not take place by an abrupt, but rather by a gradual increase in the motor speed n, so as not to irritate the driver by a sudden change of the steering feel. If during the type of operation load C a high speed of current rise is detected, which is due to rapid steering movements, a switchover to the full load A type of operation can take place at any time.

The output stage full load A is left when the current consumption of the motor drops or the time-dependent current consumption dI/dt falls below a predetermined value, with a delay time being able to be provided before the actual switchover. By a gradual lowering of the motor speed n, a switchover takes place into the output stage load C. If the (time-dependent) current consumption falls further below a given threshold value, a switchover is carried out into the output stage standby B, a delay time and/or a gentle transition being again able to be provided by a speed ramp.

The use of microprocessor technology makes it possible, in particular for the output stages load C and standby B, to program any desired dependences of the motor speed n and hence of the hydraulic flow Φ on the vehicle velocity v, in order to achieve an optimum adaptation of the steering to the traveling behavior of the vehicle. By the lowering of the output stage standby B illustrated in FIG. 5 with increasing vehicle velocity v, the current consumption in this output state is lowered, so that the difference from the given threshold value for the switchover into the output stage load C or full load B is increased. Thereby, with high vehicle velocities, the effect of the vehicle velocity dependence of the steering is further intensified, because compared with low vehicle velocities, a switchover into the output stage load C or full load A only takes place with a greater rise of the motor current. If, however, this is not desired, then the effect can be compensated by suitable measures (e.g. by a velocity-dependent threshold value).

In addition to the middle output stage C, in the method according to the invention also further output stages can be provided between full load A and standby B, into which the pump drive motor can be switched.

The possible change of the output stages was described with the example of a dependence of the output stages B and C on the vehicle velocity v. However, a change of one or more output stages as a function of another or several parameters is also possible.

In accordance with the provisions of the parent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling an electric pump drive motor of a power steering device for a motor vehicle, the method comprising the steps of:
   (a) providing a drive motor having at least three operational output stages, the output stages including a high output stage in which the motor speed is independent of the vehicle speed, a low output stage in which the motor speed is a function of the vehicle speed and at least one further middle output stage in which the motor speed also is a function of the vehicle speed, the motor being connected to a device for monitoring the motor current consumption;

(b) monitoring the current consumption of the motor; and (c) switching over between the three output stages with the switching over taking place as a function of the current consumption of the motor.

2. The method according to claim 1, the switchover of the motor between the individual output stages takes place as a function of at least one further switchover parameter.

3. The method according to claim 2, wherein one switchover parameter is the absolute current consumption according to the load of the pump driven by the motor.

4. The method according to claim 2, one switchover parameter is the time-dependent change of the motor current consumption.

5. The method according to claim 1, wherein at least one motor output stage is changed such that with increasing vehicle velocity the speed of the motor decreases.

6. The method according to claim 5, wherein the change of the output stage takes place linearly.

7. The method according to claim 1, wherein at least one of the following switchovers takes place by a gradual change of the speed of the motor and only after a delay time:
from the low output stage into the middle output stage;
from the high output stage into the middle output stage;
from the middle output stage into the low output stage.

8. The method according to claim 1, wherein at least one of the following switchovers takes place only after a delay time:
from the low output stage into the middle output stage;
from the high output stage into the middle output stage;
from the middle output stage into the low output stage.

9. The method according to claim 1, wherein at least one of the following switchovers takes place by a gradual change of the speed of the motor:
from the low output stage into the middle output stage;
from the high output stage into the middle output stage;
from the middle output stage into the low output stage.

* * * * *